United States Patent [19]
Suzuki et al.

[11] Patent Number: 5,791,224
[45] Date of Patent: Aug. 11, 1998

[54] CIRCULAR SAWING MACHINE

[75] Inventors: Akira Suzuki; Kouichi Miyamoto; Shoji Takahashi, all of Tokyo-to, Japan

[73] Assignee: Ryobi Limited, Tokyo, Japan

[21] Appl. No.: 832,116

[22] Filed: Apr. 3, 1997

Related U.S. Application Data

[63] Continuation of Ser. No. 409,868, Mar. 24, 1995, abandoned.

[30] Foreign Application Priority Data

Mar. 24, 1994 [JP] Japan .................. 6-053718
Mar. 24, 1994 [JP] Japan .................. 6-053719

[51] Int. Cl.⁶ .............. B27B 5/20; B23D 45/04; B26D 1/16
[52] U.S. Cl. .............. 83/488; 83/471.3; 83/486.1; 83/490; 83/581
[58] Field of Search .............. 83/490, 488, 489, 83/471.3, 581, 485, 486, 486.1, 574, 642, 643, 644, 633, 676

[56] References Cited

U.S. PATENT DOCUMENTS

| 1,095,399 | 5/1914 | Huntington | 83/490 |
|---|---|---|---|
| 2,937,672 | 5/1960 | Gjerde . | |
| 4,489,633 | 12/1984 | van de Wouw | 83/490 |
| 4,537,105 | 8/1985 | Bergler | 83/486.1 |
| 4,945,799 | 8/1990 | Knetzer | 83/574 |
| 5,020,406 | 6/1991 | Sasaki et al. | 83/490 |
| 5,054,352 | 10/1991 | Fushiya et al. | 83/471.3 |
| 5,257,570 | 11/1993 | Shiotani et al. | 83/490 |

FOREIGN PATENT DOCUMENTS

| 2616608 | 10/1977 | Germany | 83/471.3 |
|---|---|---|---|
| 2903574 | 9/1979 | Germany | 83/490 |
| 4123435 | 1/1992 | Germany | 83/490 |
| 444321 | 10/1992 | Japan . | |
| 4366601 | 12/1992 | Japan . | |

*Primary Examiner*—Eugenia Jones
*Assistant Examiner*—Charles Goodman
*Attorney, Agent, or Firm*—Brooks & Kushman P.C.

[57] ABSTRACT

A circular sawing machine comprises a base table, a main support link having one end swingably pivoted to the base table about a first pivotal point, a support arm pivoted to the main support link to be swingable about a second pivotal point formed to the other end of the main support link, a circular saw blade mounted to the support arm to be rotatable through a rotational shaft, and a swing motion limiting link disposed between a third pivotal point formed to the base table and a fourth pivotal point formed to the support arm. The fourth pivotal point is positioned on a line connecting the second pivotal point and the rotational shaft, and a distance between the first pivotal point and the second pivotal point, a distance between the third pivotal point and the fourth pivotal point and a distance between the second pivotal point and the rotational shaft are set substantially equal to each other. A distance between the first pivotal point and the third pivotal point is set to about two times a distance between the second pivotal point and the fourth pivotal point. A support frame member is provided for the base table to be detachable to support a workpiece. A turn table is mounted rotatably to the base table.

10 Claims, 15 Drawing Sheets

CIRCULAR SAWING MACHINE

CROSS-REFERENCE TO A RELATED APPLICATION

This application is a file wrapper continuation of application Ser. No. 08/409,868, filed Mar. 24, 1995 and now abandoned.

BACKGROUND OF THE INVENTION

The present invention relates to a circular sawing machine particularly of slidable type in which a circular saw blade is movable in a horizontal direction.

In general, there has been widely known circular sawing machines, as a cutting machine, in which a circular saw blade is rotated thereby to perform a cutting working, and the known circular sawing machines include a slidable type capable of moving the circular saw blade in a horizontal direction to perform the cutting working of a workpiece having a long dimension to be cut.

One example of such slidable type circular sawing machine is disclosed in the Japanese Utility Model Publication No. HEI 4-44321. FIG. 14 is an illustration of a side view of a circular sawing machine of the above prior art publication. Referring to FIG. 14, the circular sawing machine is provided with a holder 107 to which two through holes 107a, 107a, only one being described, are formed, and slide bars 111 are fitted into the through holes 107a, 107a respectively, so as to be slidable in the axial direction thereof. The slide bar 111 has one end portion to which a circular saw unit 113, holding a circular saw blade 117 through a hinge shaft 114, is swingably mounted.

When a workpiece 102 having a relatively long dimension to be cut is cut, the circular saw unit 113 is first positioned rightward as viewed in FIG. 14 and the circular saw unit 113 is then rotated to a lower position. Thereafter, the slide bars 111 are moved leftward as viewed while performing the cutting working by the circular saw blade 117 thereby to cut the workpiece 102 having the long dimension to be cut.

In the slidable type circular sawing machine of the structure described above, however, expensive linear bearing means have to be employed or the slide bars 111 must be manufactured with high working performance and with heat treatment to smoothly guide the slide bars 111. Furthermore, since the slide bar has a length of some measure, the guide bar is itself flexible or easily bent, and particularly, the working performance will be degraded in a cutting working with inclination. Still furthermore, when the slide bars 111 have been worn, it is difficult to adjust the position of the slide bars. In a case where a certain structure or obstruction is positioned behind the circular sawing machine, it is difficult to perform the cutting working to a workpiece having a relatively long length to be cut in the slidable manner.

In view of the above defects of the prior art, the applicant has been also provided a circular sawing machine in which a circular saw blade is moved horizontally by utilizing a link mechanism as disclosed in the Japanese Patent Laid-open Publication No. HEI 4-366601. FIG. 15 is an illustration of a side view of a circular sawing machine disclosed in this prior art publication. Referring to FIG. 15, a pivot member 204 is secured to a base table 201, and the pivot member 204 has a hinge portion 205 to which one end of a swingable main support link 206 and one end of a fixed link 207 are mounted. A support arm member 209 is secured swingably at its intermediate portion to the other one end of the main support link 206 through a hinge portion 208. An upper cover 212 is disposed to a right side end, as viewed, of the support arm member 209 so as to cover a circular saw blade 211, and a circular saw blade 211 is mounted to the upper cover 212 through a rotational shaft 213. A swing motion limiting link 214 having a length less than that of the main support link 206 is connected swingably to the front side end of the fixed link 207 through a hinge portion 210. The swing motion limiting link 214 is formed with an elongated hole 214a with which a pin 209a provided to a left side end, as viewed, of the support arm member 209 is engaged. Furthermore, a coil spring 215 is provided for the hinge portion 205 so as to urge the main support link 206 in a clockwise direction around the hinge portion 205. A coil spring 216 is further provided for the hinge portion 208 so as to urge the support arm member 209 in a counterclockwise direction around the hinge portion 208.

In the cutting working, the workpiece 203 is placed on a turn table 202, and the support arm member 209 is then rotated about the hinge portion 208 against the urging force of the coil spring 216. The rotation (pivotal motion) of the support arm member 209 is limited at its lower limit position to limit its rotation over a predetermined amount on the side of the circular saw blade 211 because the one end of the support arm member 209 is limited by the swing motion limiting link 214. Thereafter, the main support link 206 is rotated in the counterclockwise direction about the hinge portion 205 with a handle being supported by an operator. Then, the circular saw blade 211 moves leftward as viewed thereby to carry out the cutting working to the workpiece 203. During this leftward movement of the circular saw blade 211, the link mechanism of parallezoidal shape is also moved, so that the hinge portion 208 is moved so as to describe an arc. However, since the end portion of the support arm member 209 is pivoted to the swing motion limiting link 214 having a length less than that of the main support link 206, the lower limit position of the circular saw blade 211 takes substantially horizontal position. Accordingly, under this state, when the support arm member 209 is moved under pressure, the circular saw blade 211 is moved horizontally. Further, the support arm member 206 is then rotated about the hinge portion 208 in the counterclockwise direction by the urging force of the coil spring 216, and the main support link 206 is also rotated about the hinge portion 205 in the clockwise direction by the urging force of the coil spring 215, thus returning to the original position.

As described above, in the prior art of the Japanese Patent Laid-open Publication No. HEI 4-366601, since the circular saw blade is moved horizontally with the lower limit of the support arm member being limited during the working, the support arm member has to be always pressed downward, thus being inconvenient in its workability. In addition, since two coil springs having opposing urging directions to each other are utilized, it is difficult or troublesome to maintain the coil springs in a well adjusted condition, thus also providing a problem.

SUMMARY OF THE INVENTION

An object of the present invention is to substantially eliminate defects or drawbacks encountered in the prior art and to provide a circular sawing machine having a compact structure and light weight and being capable of achieving an improved maneuvability of the circular sawing machine at a time when it is moved in a horizontal direction.

This and other objects can be achieved according to the present invention by providing, in one aspect, a circular sawing machine comprising:

3 a base table;

a main support link having one end swingably pivoted to the base table about a first pivotal point;

a support arm pivoted to the main support link to be swingable about a second pivotal point formed on another end of the main support link;

a circular saw blade mounted to the support arm to be rotatable about a rotational shaft; and a swing motion limiting link disposed between a third pivotal point formed on the base table and a fourth pivotal point formed on the support arm, wherein the fourth pivotal point is positioned substantially on a line connecting the second pivotal point and the rotational shaft, a distance between the first pivotal point and the second pivotal point, a distance between the third pivotal point and the fourth pivotal point and a distance between the second pivotal point and the rotational shaft are set substantially equal to each other, and a distance between the first pivotal point and the third pivotal point is set to 1.8 to 2.2 times a distance between the second pivotal point and the fourth pivotal point.

In another aspect of the present invention, there is provided a circular sawing machine comprising:

a base table;

a main support link having one end swingably pivoted to the base table about a first pivotal point;

a disc link pivoted to the base table;

a support arm pivoted to the main support link to be swingable about a second pivotal point formed on another end of the main support link;

a circular saw blade mounted to the support arm to be rotatable through a rotational shaft; and a swing motion limiting link disposed between a third pivotal point formed on the disc link and a fourth pivotal point formed on the support arm, wherein when a workpiece having a short length to be cut is cut, the swing motion of the support arm is limited with respect to the main support link and the main support link is swung vertically with respect to the base table, and when a workpiece having a long length to be cut is cut, the support arm is swung in front and rear direction with respect to the main support link and the main support link is swung with respect to the base table.

In a further aspect of the present invention, there is provided a circular sawing machine comprising:

a base table;

a main support link having one end swingably pivoted to the base table;

a support arm swingably pivoted to another one end of the main support link;

a circular saw blade mounted to the support arm to be rotatable through a rotational shaft; and a support frame member provided for the base table and adapted to support a workpiece in a range without contacting the circular saw blade during a cutting working thereof.

In the above respective aspects, the following characteristic features may be selectively adapted.

The base table is provided with a disc link which is swingable about the first pivotal point and on which said third pivotal point is formed. An elastic member such as coil spring is disposed between the base table and the main support link so as to urge the main support link from a cutting working finishing position to an initial cutting working position.

4

The disc link is provided with a recessed portion and the base table is provided with a projection to be engagable with the recessed portion so that when an end portion of the recessed portion abuts against the projection, a rotational motion of the disc link is limited.

An abutment pin is formed on the main support link in a projecting manner and when the support arm abuts against the abutment pin, a clockwise rotation of the support arm about the second pivotal point is limited. An abutment member is formed on the main support link in a projecting manner and when the swing motion limiting link abuts against the abutment member, a counterclockwise rotation of the support arm about the second pivotal point is limited.

The base table is provided with a support frame member on which a workpiece to be worked is placed and which is disposed proximate to but not contacting the circular saw blade.

The support frame member has a pipe structure and is disposed to be swingable with respect to the base table. The support frame member may be detachably provided for the base table.

According to the present invention of the characters described above, when the cutting working is performed, a workpiece to be cut is placed on the base table and the support arm is pulled. The support arm is rotated about the second pivotal point with respect to the main support link, and at the same time, the main support link is also rotated about the first pivotal point. Under the condition, the circular saw blade is slid rearward while maintaining the abutting condition of the circular saw blade abutting against the workpiece thereby to cut the workpiece. During this cutting working, since the support arm is limited in its rotation by the swing motion limiting link, the rotational shaft supporting the circular saw blade is moved substantially horizontally.

In the specified aspect, when a workpiece having a short length to be cut is worked, the main support link is swung about the first pivotal point with respect to the base table without rotating the support arm to which the circular saw blade is provided. Then, the saw blade abuts against the workpiece to cut the same. In such case, the main support link is swung to cut the workpiece against the urging force of the elastic member such as coil spring, and after the cutting working, the main support link returns its initial position by the urging force of the elastic member.

On the contrary, when a workpiece having a long length to be cut is worked, as mentioned above, the workpiece to be cut is placed on the base table and the support arm is pulled. The support arm is rotated about the second pivotal point with respect to the main support link, and at the same time, the main support link is also rotated about the first pivotal point. Under the condition, the circular saw blade is slid rearward while maintaining the abutting condition of the circular saw blade abutting against the workpiece thereby to cut the workpiece. In such case, since the main support link is swung by the urging force of the elastic member during the movement of the circular saw blade in the cutting working, the circular saw blade can be moved with small operational force.

When the workpiece having a relatively large size to be cut, the support frame of the pipe structure is positioned in the working position and the workpiece is placed thereon. At this time, since the circular saw blade does not contact the support frame, it is not necessary to employ the base table having a large size. Further, when the cutting working has been finished, the support frame is moved to its accommodation portion, thus reducing the space for accommodating the same.

The further natures and features of the present invention will be more clearly understood from the following descriptions of preferred embodiments made with reference to the accompanying drawings.

DESCRIPTION OF THE PREFERRED EMBODIMENTS

One preferred embodiment of the present invention will be described hereunder with reference to the accompanying drawings.

Figure 1:
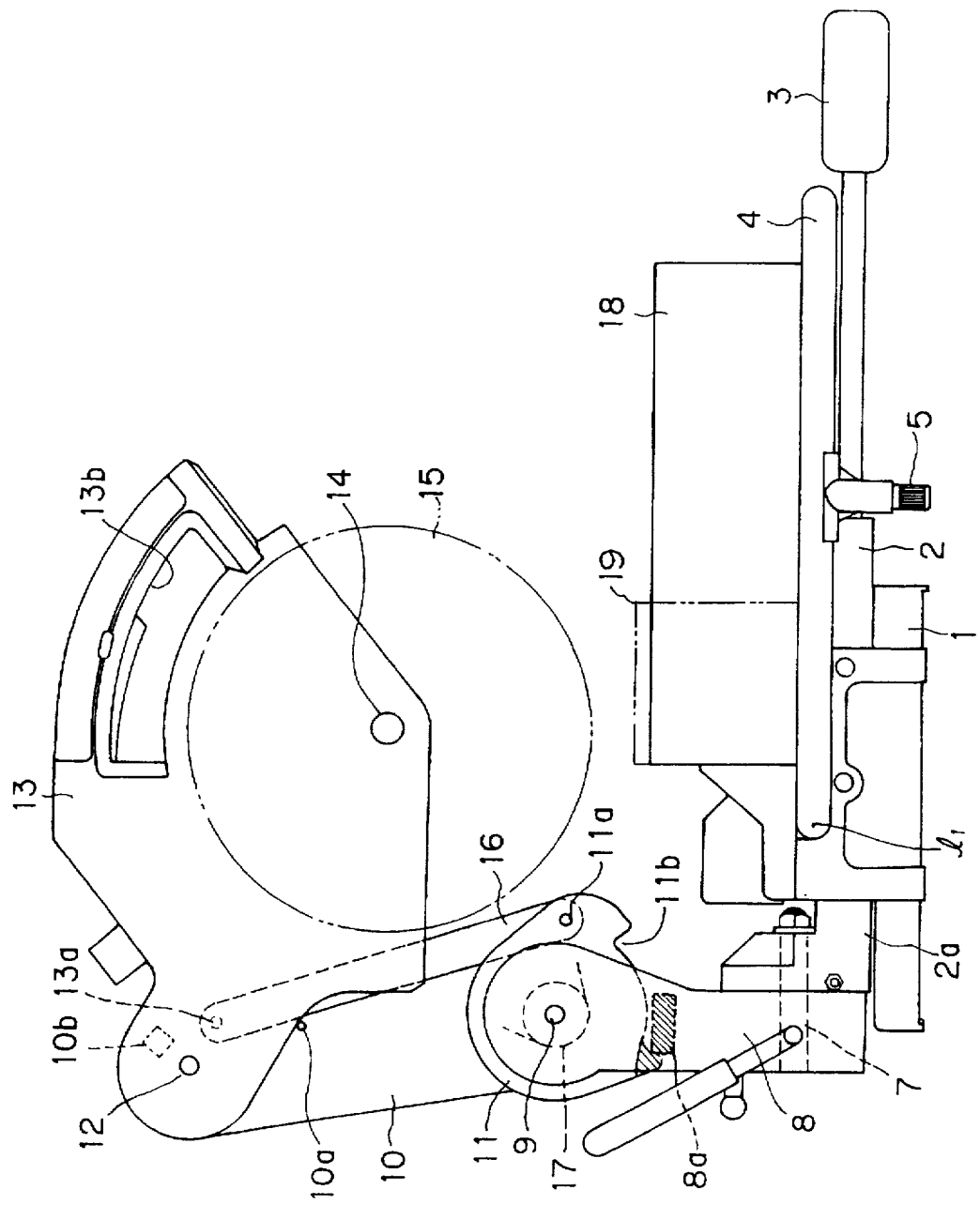
FIG. 1 is a side view of a circular sawing machine according to one embodiment of the present invention.
Figure 2:
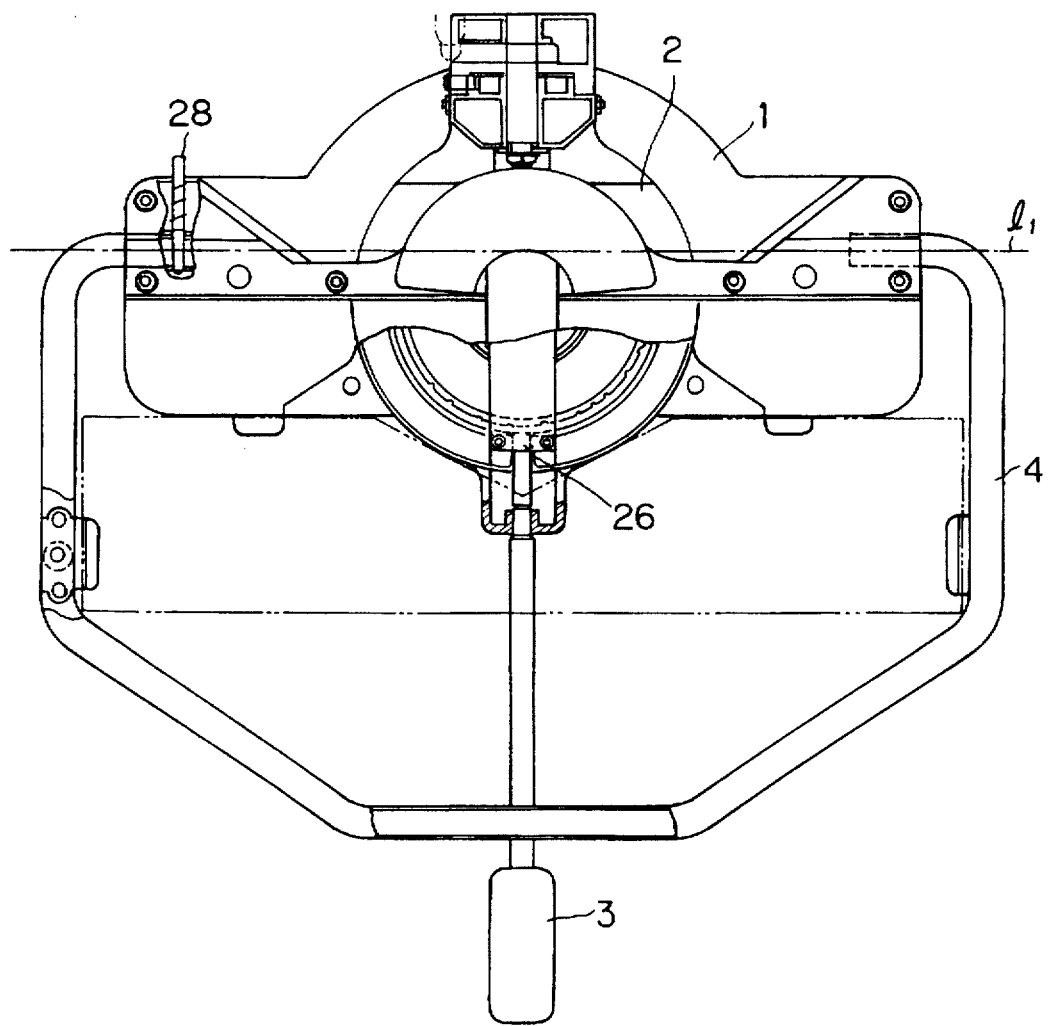
FIG. 2 is a plan view of the circular sawing machine of FIG. 1.

First, referring to FIGS. 1 and 2, showing side and plan views of a circular sawing machine according to the present invention, in which reference numeral 1 denotes a base table 1 to which a turn table 2 is mounted to be rotatable. An operation handle 3 is secured to be detachable to the turn table 2 for rotating the same.

Figure 3:
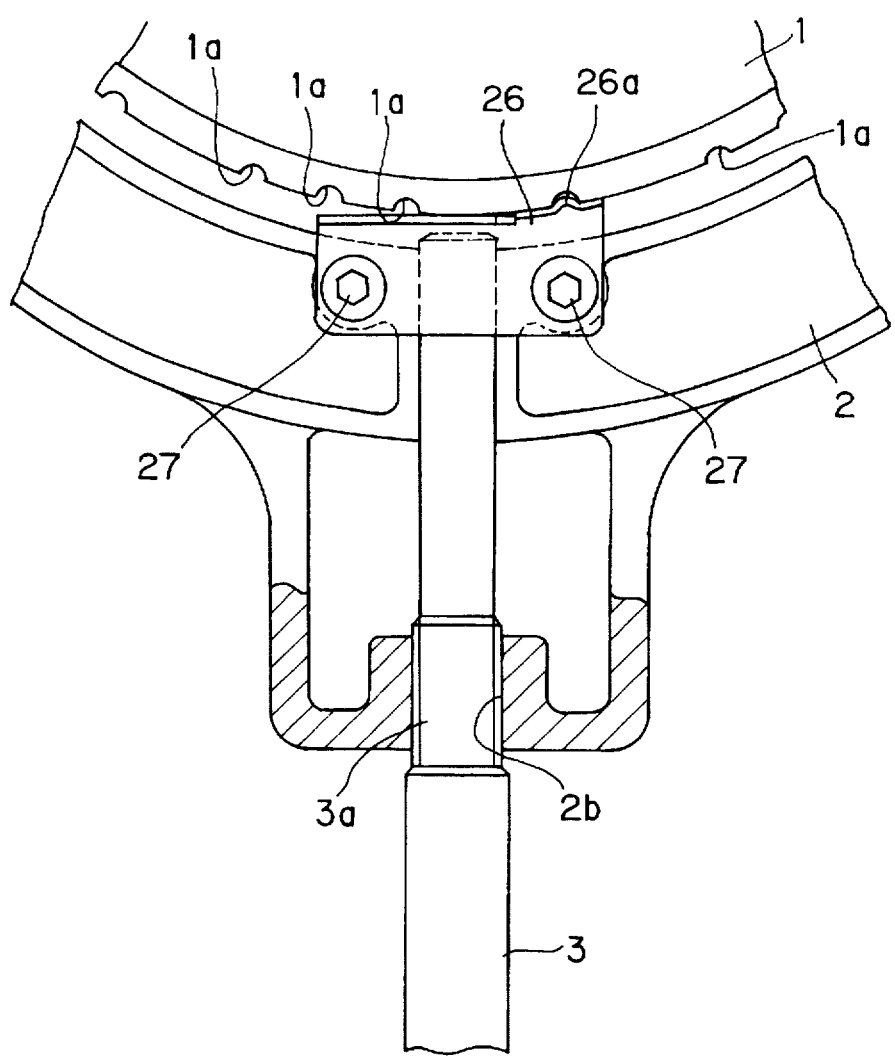
FIG. 3 is a plan view in an enlarged scale showing a partial portion of a turn table and a base table of the circular sawing machine of FIG. 1.

FIG. 3 is an enlarged view showing a mounting portion of the operation handle 3. Referring to FIG. 3, the turn table 2 is formed with a female thread 2b and the handle 3 is formed with a male thread 3a which is screw engaged with the female thread 2b of the turn table 2. A plate spring 26 is fixed to the turn table 2 by means of bolts 27, 27. The plate spring 26 is formed with a projection 26a at an outer peripheral portion thereof, and the projection 26a is engagable with a plurality of recesses 1a, 1a, . . . 1a formed to an outer periphery of the base table 1. The turn table 2 is rotated with the projection 26a of the plate spring 26 being successively engaged with the recesses 1a, 1a, . . . 1a of the base table 1 while giving clicking feeling to the rotation of the turn table 2. When it is required to fix the rotational position of the turn table 2, the handle 3 is screwed thereby to press the plate spring 26 to the base table i and hence to fix the rotational position of the turn table 2.

Figure 4:
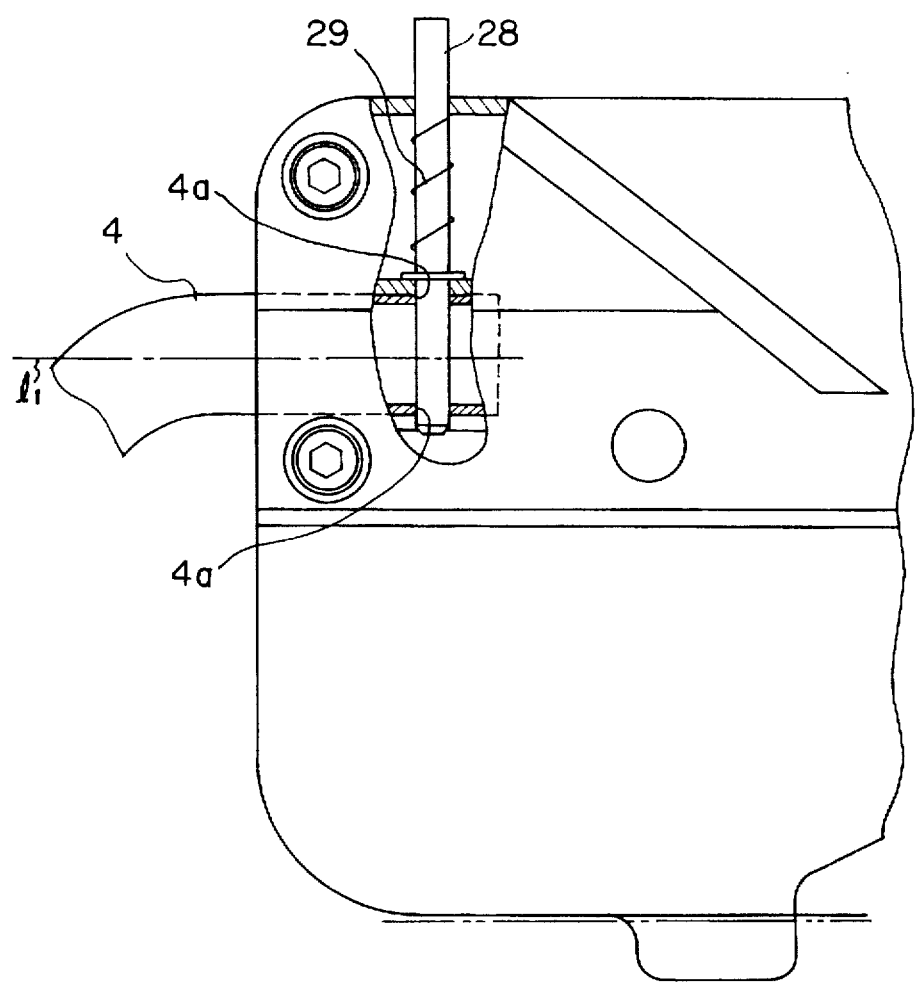
FIG. 4 is a view partially showing a support frame pipe of the circular sawing machine of FIG. 1.

Referring to FIG. 2, a support frame 4 of a pipe structure as a level stool member is provided to the base table 1 around a line $l_1$ to be rotatable, and the support frame pipe 4 has an end portion to which perforations 4a are formed as shown in FIG. 4. A pin 28 is inserted throughout the perforations 4a and the pin 28 also penetrates the base table 1 and is always urged downward, as viewed, by means of a spring 29. The insertion of the pin 28 throughout the perforations 4a of the support frame pipe 4 limits the rotation of the support frame pipe 4 around the linear line $l_1$. The support frame pipe 4 is also formed with other perforations, not shown, with an angle different from that of the perforations 4a, whereby the support frame pipe 4 is positioned selectively to a portion used for its carrying time or a portion at which a workpiece is placed, by selectively inserting the pin 28 into either one of these perforations.

As shown in FIG. 1, the support frame pipe 4 is provided with an adjustment foot 5 to be adjustable in its height. A pivot 2a of the turn table 2 is mounted on the left side surface, as viewed in FIG. 1, of the base table 1, and a support member 8 is provided for the pivot 2a through a shaft 7 to be pivotal thereabout. One end of a main support link 10 and a central portion of a disc link 11 are mounted to a shaft, or first pivotal point, 9 to be rotatable thereabout. A support arm 13 is mounted to another end of the main link 10 to be rotatable through a shaft, or second pivotal point, 12, and a circular saw blade 15 is mounted to a proper portion of the support arm 13 through a rotational shaft 14. This rotational shaft 14 is driven by a known driving means such as electric motor, which is not shown because of difficulty for showing on the present figure. The disc link 11 has a pin, or third pivotal point, 11a projecting outward and one end of a swing motion limiting link 16 is rotatably pivoted to the pin 11a and another end of the swing motion limiting link 16 is also rotatably pivoted to a pin, or fourth pivotal point, 13a formed on the support arm 13 in a projecting manner, the swing motion limiting link 16 being disposed on the same side of the main support link 10 as the circular saw blade 15. A coil spring 17 is wound up around the shaft 9 to urge the main support link 10 in a counter-clockwise direction. The disc link 11 is further formed with a recess 11b with which a projection 8a formed on the support member 8 is engagable. The disc link 11 is limited in its rotation by the abutment of the end portion of the recess 11b against the projection 8a.

An abutment pin 10a is formed on a proper portion of the main support link 10, and when the support arm 13 abut against the abutment pin 10a, the central portion of the shaft 12 of the support arm 13 is limited in its rotation in the clockwise direction as viewed. The main support link 10 is further provided with an abutment member 10b in a projecting manner, and when the swing motion limiting link 16 abuts against the abutment member 10b, the support arm 13 is limited in its rotation about the shaft 12 in the counter-clockwise direction.

In such the structure as described above, a distance between the shaft 9 and the shaft 12, a distance between the pin 11a of the disc link 11 and the pin 13a of the support arm 13 and a distance between the shaft 12 and the rotational shaft 14 are made all equal to each other, for example, to 230 mm in the present embodiment. The pin 13a of the support arm 13 is positioned substantially on a line connecting the shaft 12 and the rotational shaft 14, and furthermore, a distance from the shaft 9 to the pin 11a is set about two times the distance from the shaft 12 to the pin 13a. In the present embodiment, the distance from the shaft 9 to the pin 11a is set to 60 mm and the distance from the shaft 12 to the pin 13a is set to 30 mm.

The circular sawing machine of the structure described above will be operated in the following manner.

First, with reference to FIG. 4, the pin 28 is pulled outward, i.e. upward as viewed in the figure, against the urging force of the spring 29 to draw out the pin 28 from the perforation 4a of the support frame pipe 4. Under the condition, the support frame pipe 4 is rotated about the linear line $l_1$ to tilt the same to the position shown in FIG. 4. The adjustment foot 5 is then adjusted in its height so that the upper portion of the support frame pipe 4 takes a horizontal attitude. Next, with reference to FIG. 3, the handle 3 is mounted to the turn table 2 by screwing the male thread portion 3a of the handle 3 with the female thread portion 2b of the turn table 2. The handle 3 is then gripped and the turn table 2 is rotated with respect to the base table 1 to a desired position at which the turn table 2 is fixed in position.

Figure 5:
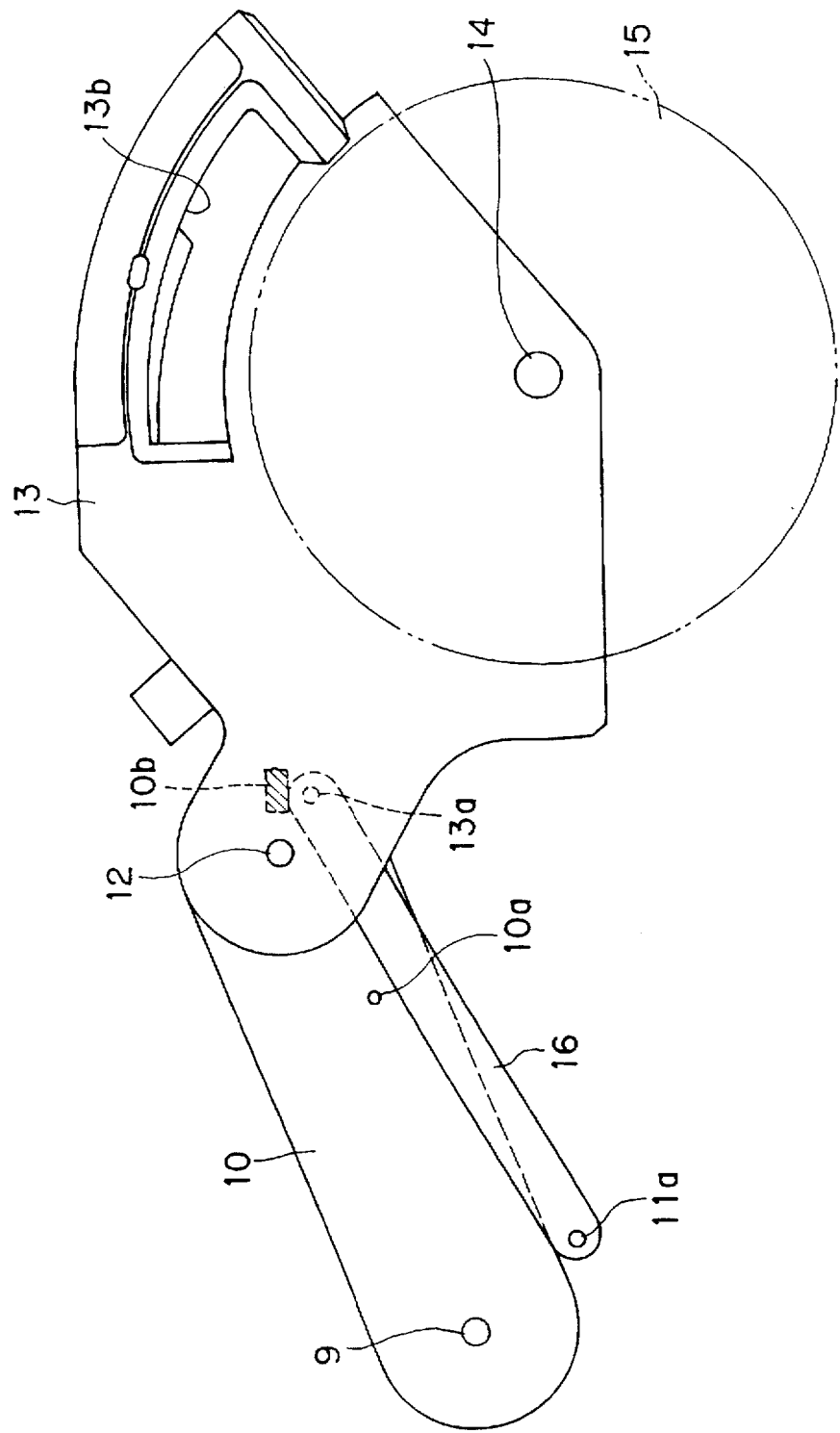
FIG. 5 is an illustrated side view of a circular saw blade of the circular sawing machine of FIG. 1.

With reference to FIG. 1, a workpiece 18 having relatively a long length to be cut is placed on the support frame pipe 4 and the turn table 2. Under the condition, an operator grips a gripping portion 13b of the support arm 13 to move the support arm 13 in the rightward direction as viewed in FIG. 1. At this time, the main support link 10 is rotated in the clockwise direction about the shaft 9 and the support arm 13 is also rotated in the counterclockwise direction about the shaft 12. During the rotation of the support arm 13 about the shaft 12, the swing motion limiting link 16 abuts against the abutment member 10b as shown in FIG. 5, the support arm 13 is prohibited from its further rotation about the shaft 12. Then, under the condition that the rotating motion of the support arm 13 in the counterclockwise direction as viewed in the figure is limited, the main support link 10 is rotated in the clockwise direction about the shaft 9. During this rotating motion, the swing motion limiting link 16 is also moved, the disc link 11 is rotated so that the end portion of the recess 11b abuts against the projection 8a, and the disc link 11 is also prohibited from further rotating in the clockwise direction about the shaft 9 thereby to decide the lower limit position of the circular saw blade 15.

Figure 6:
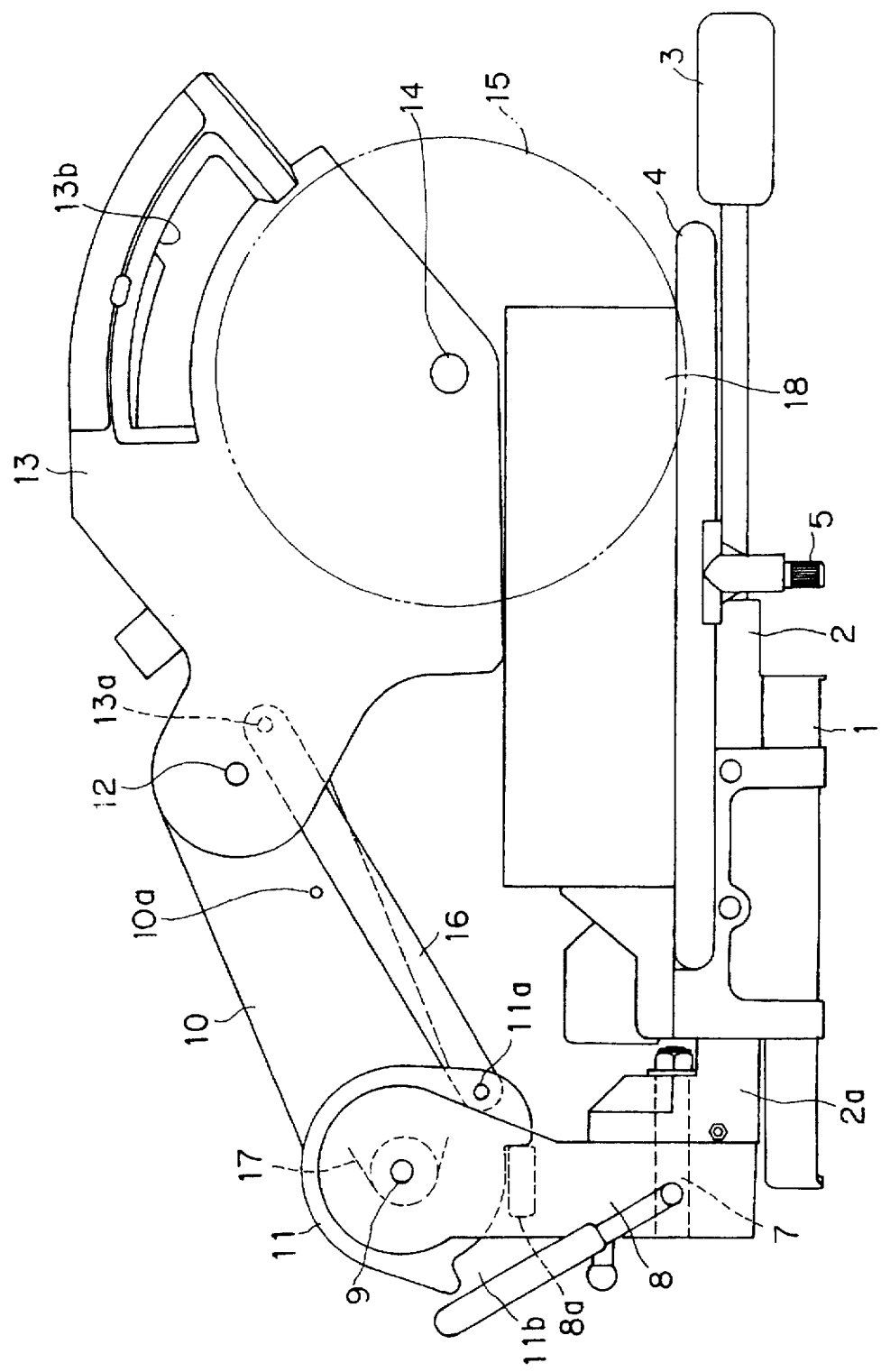
FIGS. 6 to 8 are illustrated side views of the circular sawing machine of FIG. 1 in various working positions thereof.
Figure 7:
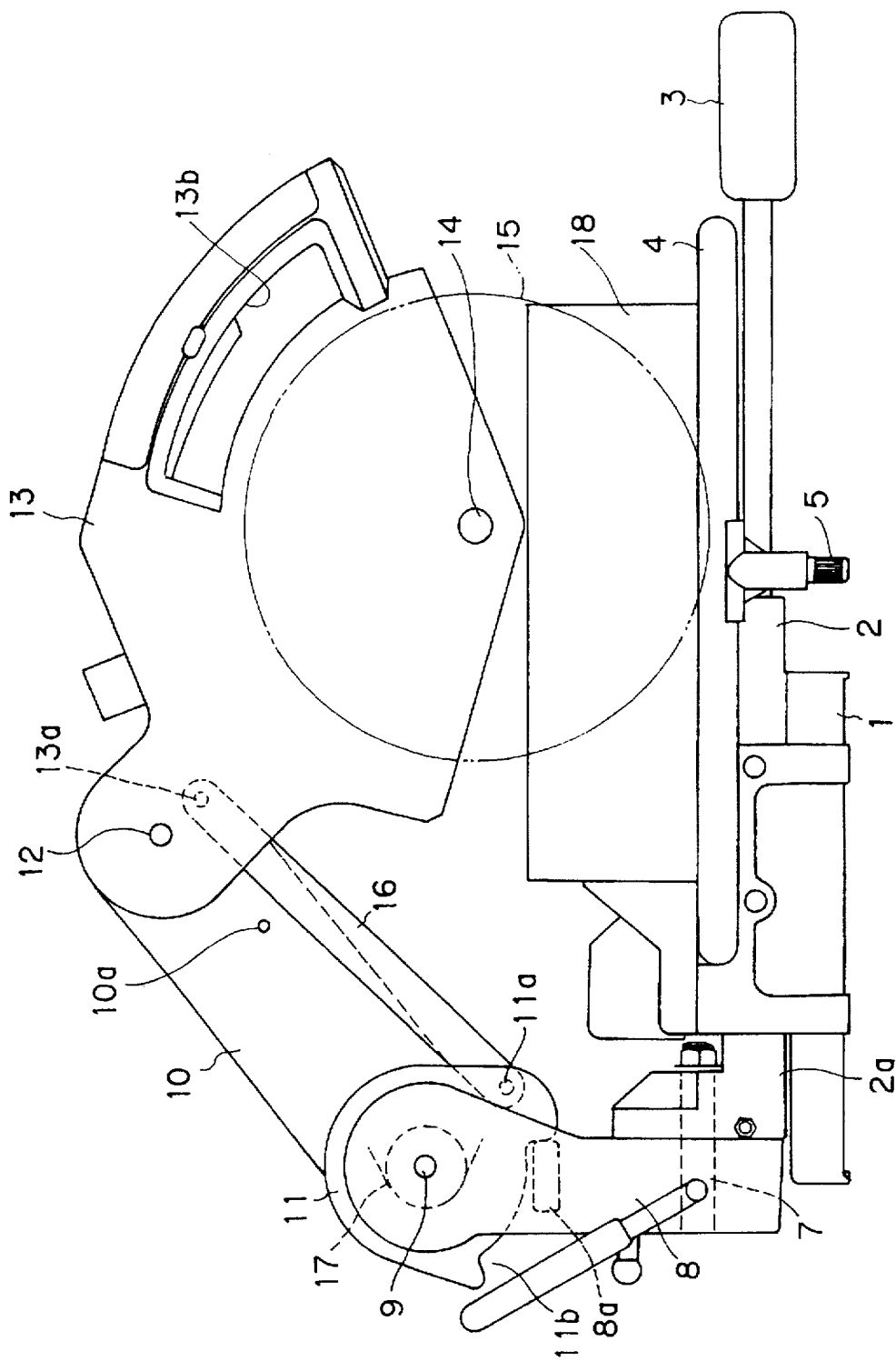

During the above operations, the workpiece 18 is partially cut. In the next step, the support arm 13 is moved in the leftward direction as viewed in FIG. 6 with the gripping portion 13b of the support arm 13 being gripped. That is, the main support link 10 is rotated in the counterclockwise direction about the shaft 9, and the support arm 13 is also rotated in the counterclockwise direction about the shaft 12 as in FIG. 7. In this operation, the support link 10 can be rotated with small force of the operator because of the urging force of the coil spring 17.

Figure 8:
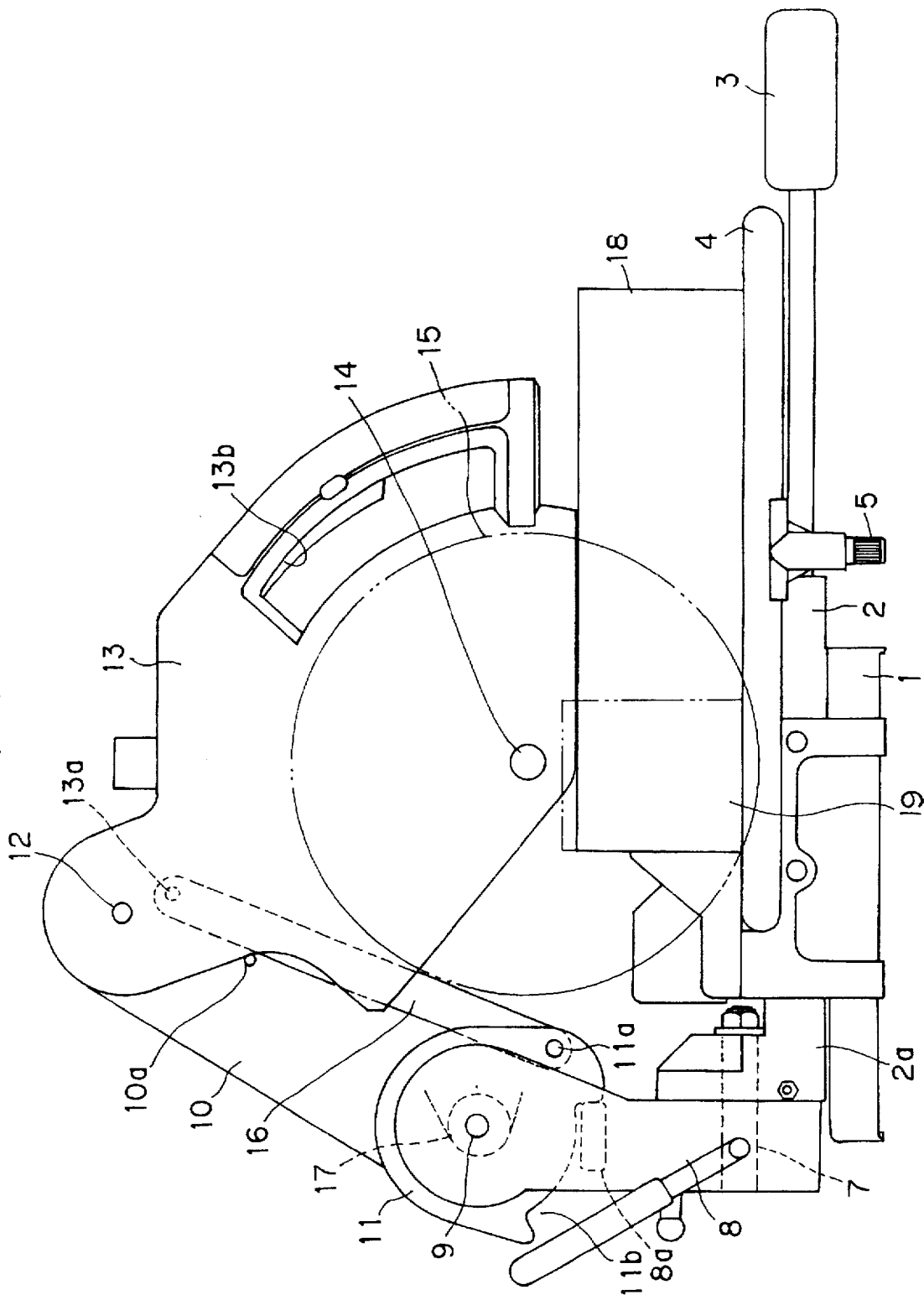
Figure 9:
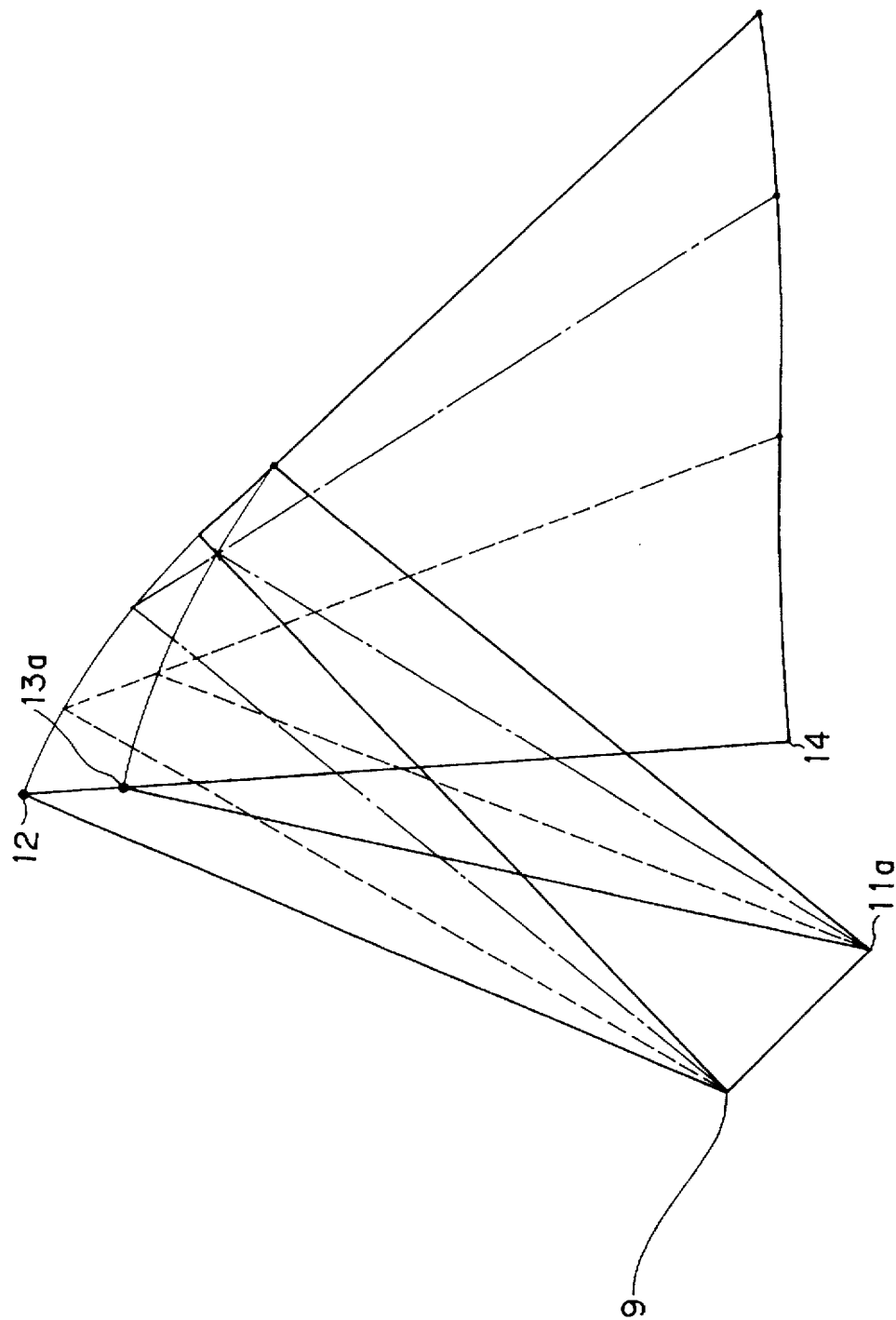
FIG. 9 is a view showing a moving locus of the circular saw blade of the circular sawing machine of FIG. 1.

The circular saw blade 15 is then moved in the leftward direction as in FIG. 8 till the support arm 13 abuts against the abutment pin 10a, and the cutting working is finished at the position at which the support arm 13 abuts against the abutment pin 10a. The moving locus of the circular saw blade 15 during the cutting working thereof is represented as substantially horizontal moving locus as shown in FIG. 9, which is an analysis of the moving locus of the rotational shaft 14 supporting the circular saw blade 15 and the dimension of this moving locus is set half (½) the value mentioned hereinbefore with respect to the present embodiment. As can be understood from this moving locus of FIG. 9, the rotational shaft 14 does not carry out strictly but carries out the horizontal linear motion. Thereafter, when the main support link 10 is rotated in the counterclockwise direction about the shaft 9 as in FIG. 8 by the urging force of the coil spring 17, the support arm 13 is also moved while being rotated about the shaft 9, and the position of the pin 13a supporting one end of the swing motion limiting link 16 is also moved. According to this motion, the disc link 11 is rotated about the shaft 9 and the end portion of the recess 11b abuts against the projection 8a, thus being held in the initial condition of FIG. 1.

In the initial condition, the rotating motion of the main support link 10 in the counterclockwise direction about the shaft 9 is limited for the reason that when the main support link 10 is rotated in the counterclockwise direction, the support arm 13 is rotated in the clockwise direction about the shaft 12 under the condition that the main support arm 13 is limited in its rotating motion by the abutment pin 10a of the main support link 10, and accordingly, the support arm 13 is prevented from moving and the main support link 10 is hence not rotated.

Referring to FIG. 1, when a workpiece 19 having relatively a short length to be cut is cut, the operator grips the gripping portion 13b of the support arm 13, and the shaft 12 supporting the support arm 13 is rotated in the clockwise direction about the shaft 9. During this operation, the support arm 13 is prohibited from being rotated with respect to the main support link 10. Under the condition, the workpiece 19 is cut by the circular saw blade 15.

Figure 10:
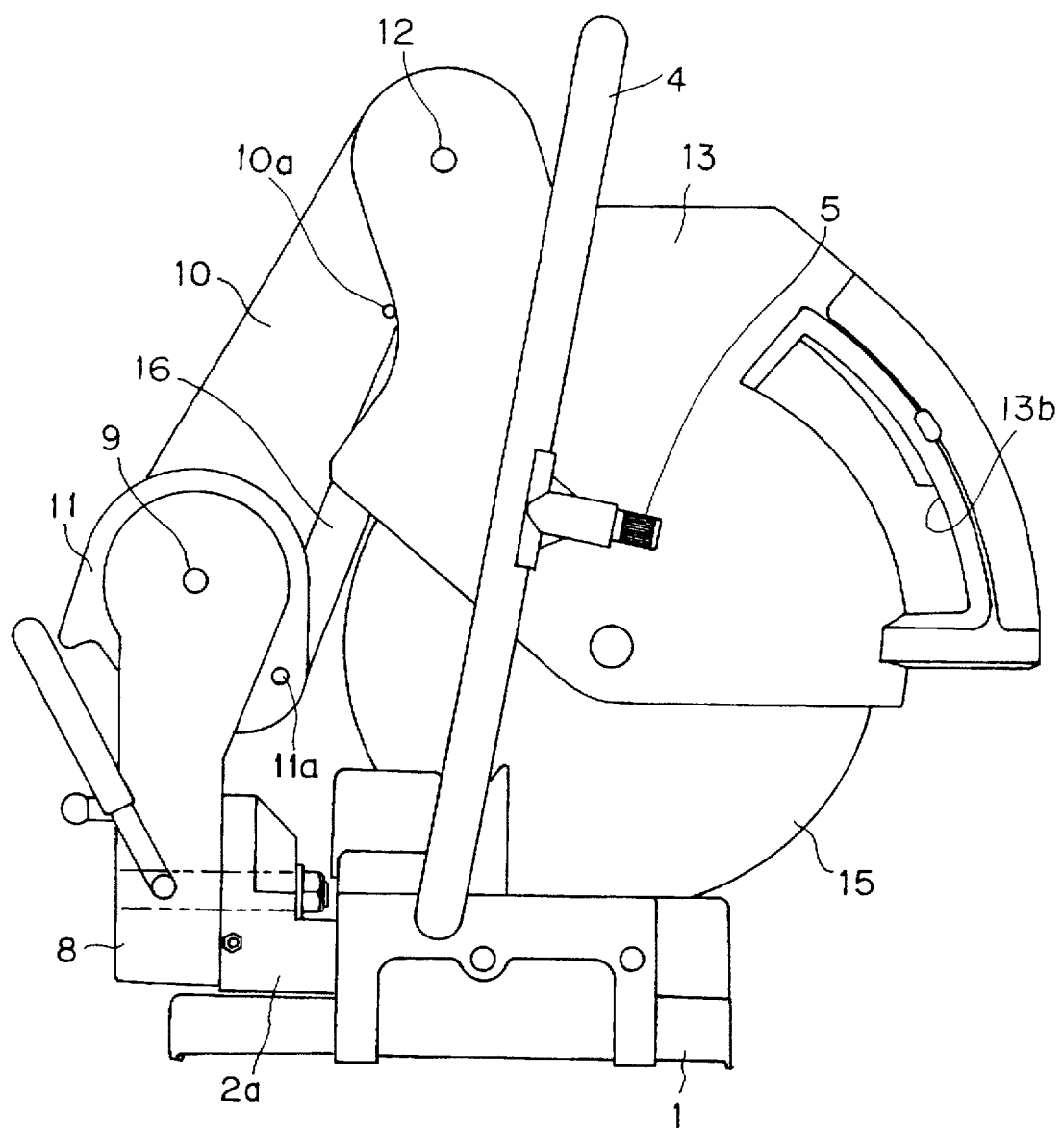
FIG. 10 is a side view of the circular sawing machine of FIG. 1.

After the completion of the cutting working, the pin 28 is pulled, in the state shown in FIG. 2, and the support frame pipe 4 is rotated about the linear line $l_1$, and then, the screw thread portion of the handle 3 is loosened to remove the same from the turn table 2. FIG. 10 is a side view showing this condition. As described above, since the support frame pipe 4 is constructed to be swingable, the size of the turn table 2 can be made compact, making possible to reduce its accommodation space. In addition, as shown in FIG. 10, the support frame pipe 4 can serve as a handle member, at a time of carrying the circular sawing machine, by moving the support frame pipe 4 upward and inserting the pin 28 thereinto.

Figure 11:
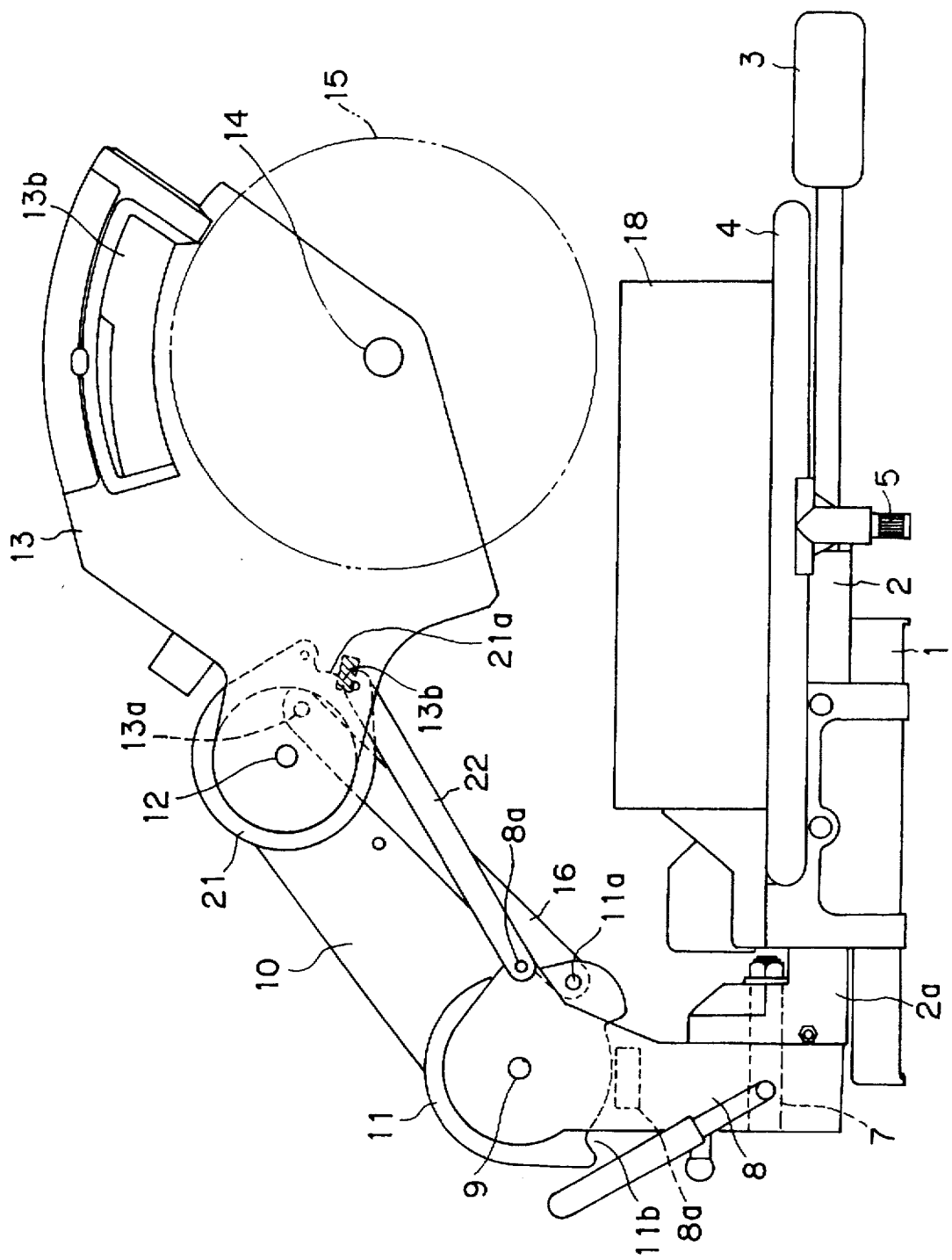
FIG. 11 is a side view of a circular sawing machine according to another embodiment of the present invention.

FIG. 11 is a side view showing another embodiment of a circular sawing machine according to the present invention, in which like reference numerals are added to members or portions corresponding to those of the above described first embodiment of the present invention.

The embodiment shown in FIG. 11 is particularly represented by one in which the rotating motion of the support arm 13 in the counterclockwise direction about the shaft 12 is limited. That is, with reference to FIG. 11, a disc link 21 is mounted to the shaft 12 to be rotatable, and a link 22 is disposed between the disc link 21 and the pin 8a of the support member 8. The disc link 21 is formed with a projection 21a and the support arm 13 is formed with an abutment portion 13b so as to abut against the projection 21a.

According to the above structure, when the support arm 13 is rotated from the shown state in the counterclockwise direction about the shaft 12, the abutment portion 13b of the support arm 13 abuts against the projection 21a of the disc link 21, but the projection 21a is limited from moving by the link 22, so that the projection 21a takes a stationary position as shown, thus the rotating motion of the support arm 13 being also limited.

In the two embodiments of the present invention described hereinbefore, the one end of the swing motion limiting link 16 is pivoted to the pin 11a of the disc link 11 mounted to the shaft 9, but in an alternation, it is not always necessary to dispose the disc link 11 and the one end of the swing motion limiting link 16 may be pivoted to the support member 8. In this alternation, although the circular saw blade 15 only attains the sliding motion in front and rear direction, the cutting performance will be improved by, for example, elongating the main support link 10 to make long the slide width thereof.

Furthermore, in the described embodiments, the turn table 2 together with the support member 8 may be eliminated, and in such case, the main support link 10 is operatively connected to the base table 1 to be rotatable about a shaft member.

Figure 12:
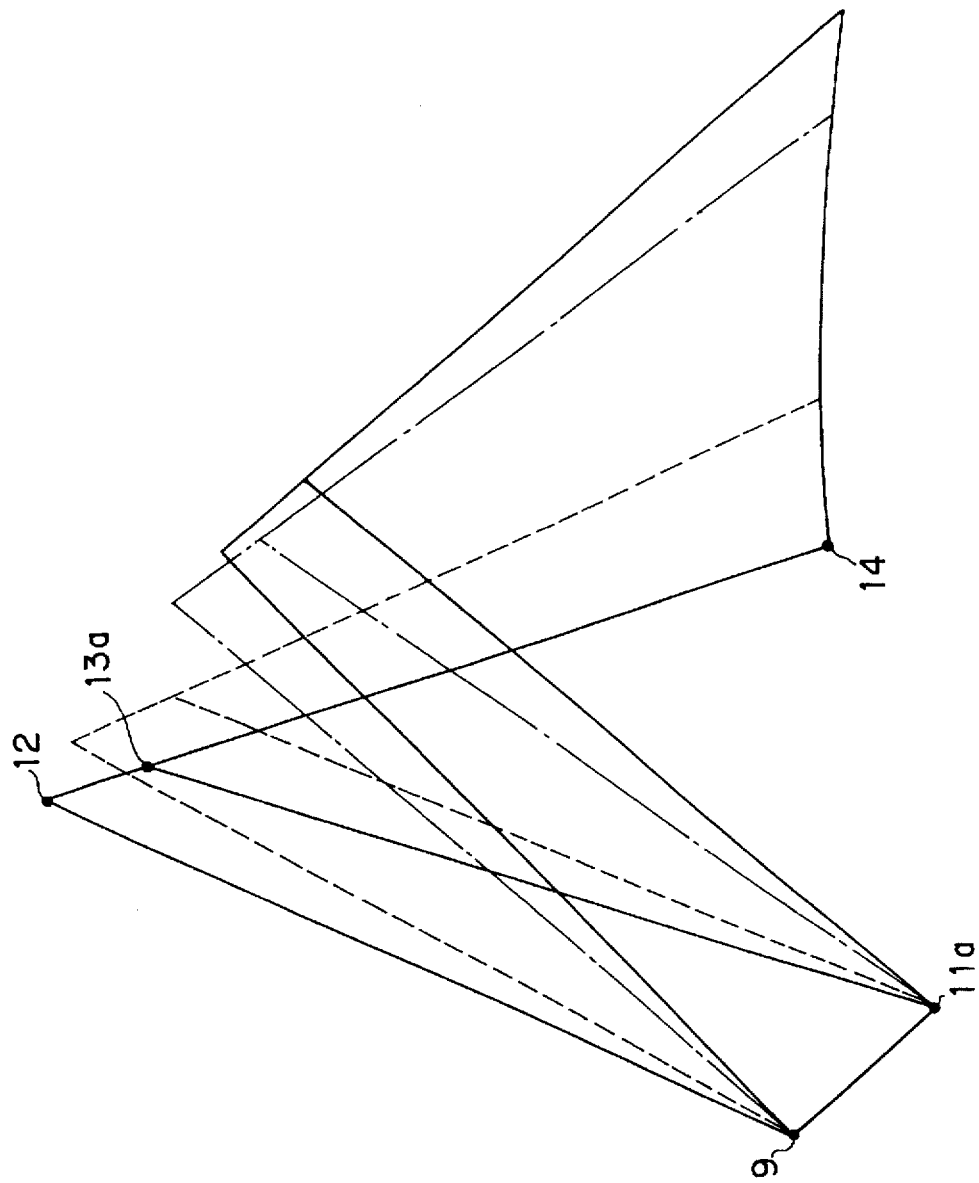
FIGS. 12 and 13 are views each showing a moving locus of the circular saw blade of the circular sawing machine of FIG. 11.
Figure 13:
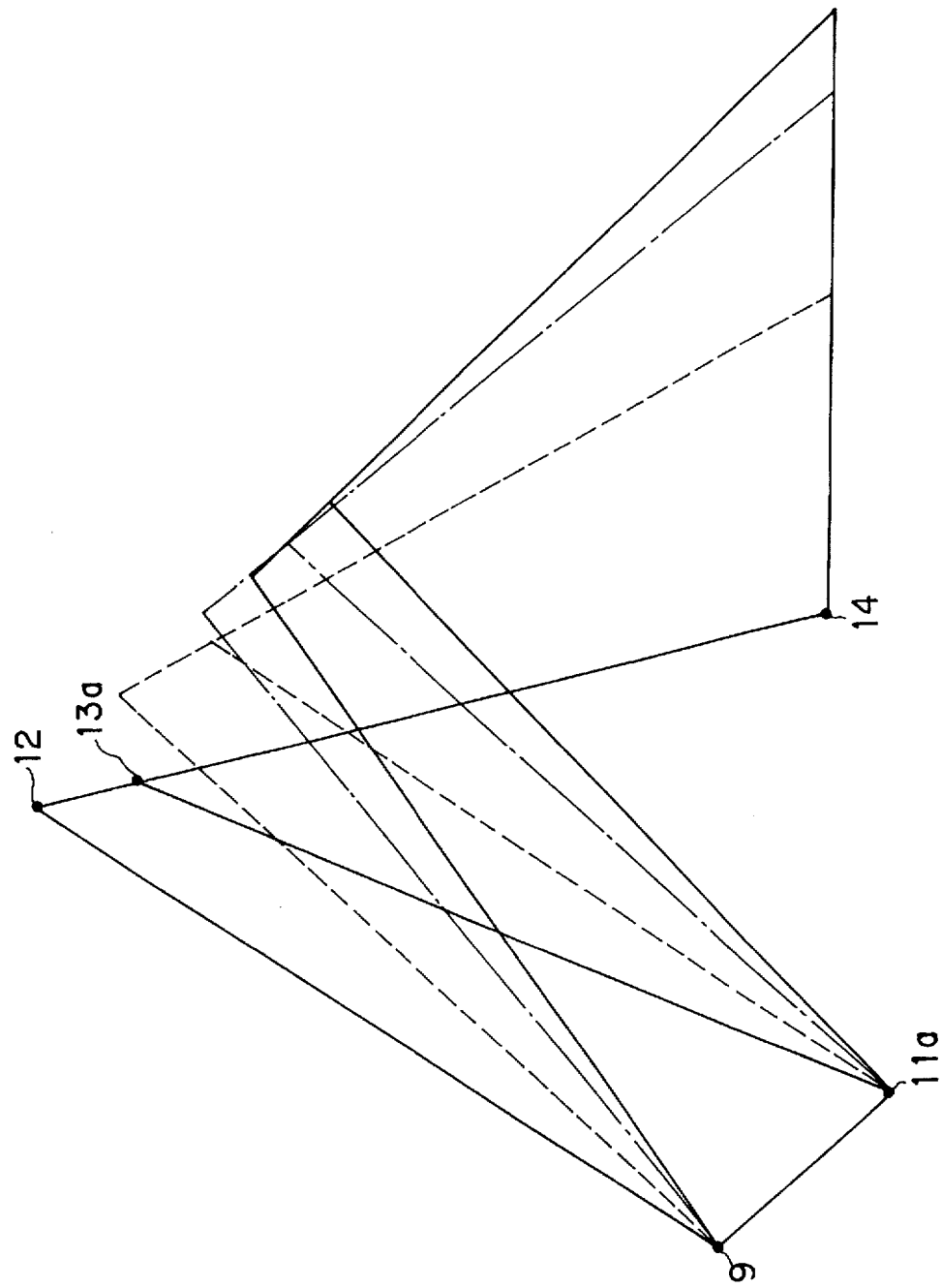
Figure 14:
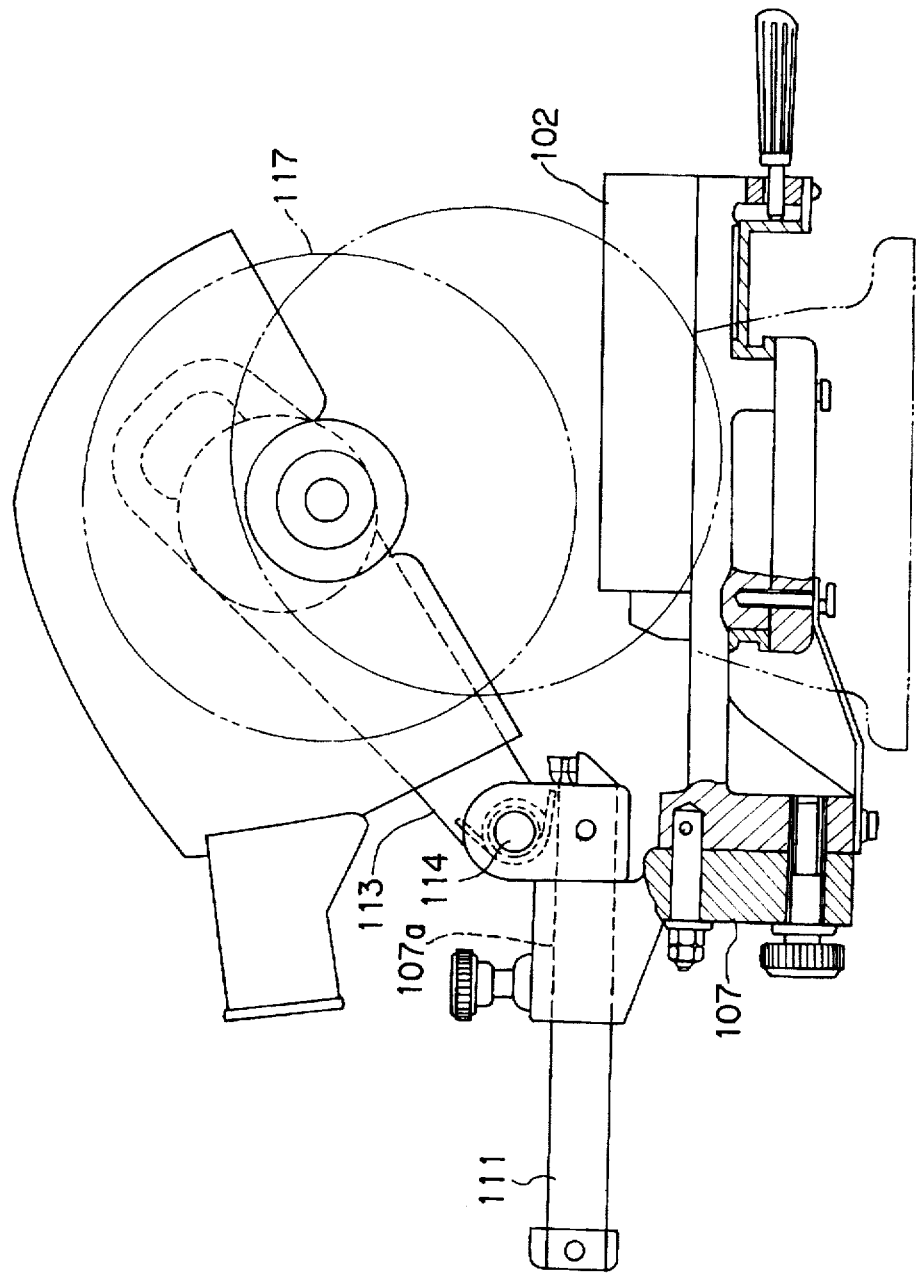
FIGS. 14 and 15 are side views of circular sawing machines of conventional structures.
Figure 15:
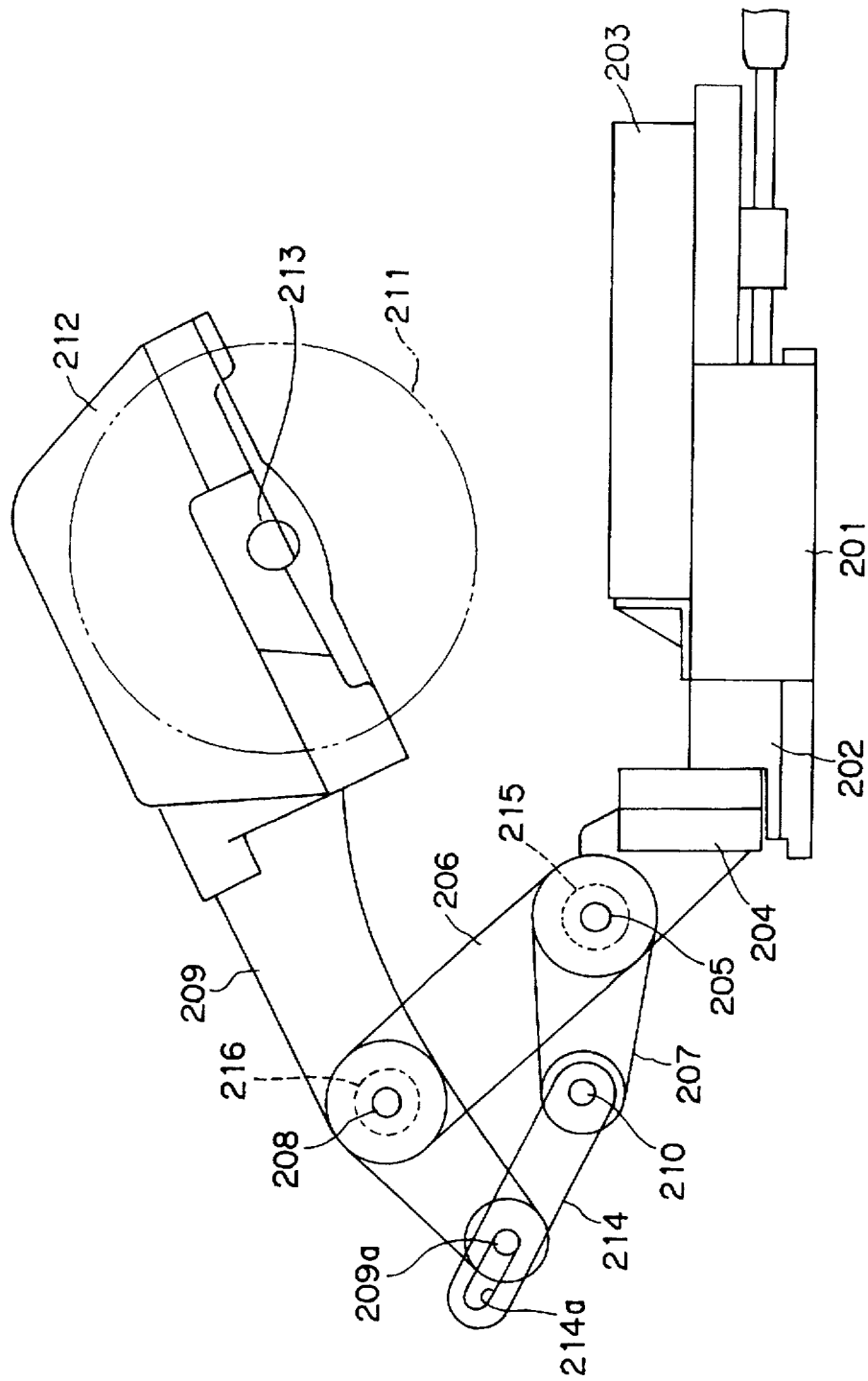

Furthermore, in these embodiments, although the distance between the shaft 9 and the pin 11a is set to 60 mm, twice the distance of 30 mm between the shaft 12 and the pin 13a is set to 30 mm, it is not always necessary to make the distance between the shaft 12 and the pin 13a twice the distance between the shaft 9 and the pin 11a, and the former distance will be set to about 1.8 to 2.2 times the latter distance for achieving substantially the same functions and effects. In this connection, FIGS. 12 and 13 show moving loci of the circular saw blade in the cases of 1.8 and 2.2 times, respectively. As can be seen from these figures, the moving locus of the circular saw blade during the cutting working moves substantially horizontally.

What is claimed is:

1. A circular sawing machine comprising:

a base table provided with a projection;

a main support link having a first end swingably pivoted to the base table about a first pivotal point;

a disk link pivoted at a central portion thereof to the base table about the first pivotal point, the disk link having a third pivotal point at a portion thereof different from the central portion and the disc link being provided with a recessed portion with which the projection of the base table is to be engageable so that when an end portion of the recessed portion abuts against the projection a rotational motion of the disc link is limited;

a support arm having a first end pivoted to a second end of the main support link to be swingable about a second pivotal point formed on the second end of the main support link;

a circular saw blade mounted to a second end of the support arm to be rotatable about a rotational shaft thereof; and a swing motion limiting link having first and second ends, said swing motion limiting link being pivoted at the first end thereof to the disk link about the third pivotal point formed on the disc link and pivoted at the second end thereof about a fourth pivotal point formed on the support arm, said swing motion limiting link being disposed to a circular saw blade side with respect to the main support link.

2. A circular sawing machine according to claim 1, wherein an elastic member is disposed between the base table and the main support link so as to urge the main support link from a cutting working finishing position to an initial cutting working position.

3. A circular sawing machine according to claim 2, wherein said elastic member is a coil spring.

4. A circular sawing machine according to claim 1, wherein an abutment pin is formed on the main support link in a projecting manner and when the support arm abuts against the abutment pin, a clockwise rotation of the support arm about the second pivotal point is limited.

5. A circular sawing machine according to claim 1, wherein an abutment member is formed on the main support link in a projecting manner and when the swing motion limiting link abuts against the abutment member, a counterclockwise rotation of the support arm about the second pivotal point is limited.

6. A circular sawing machine according to claim 1, wherein the base table is provided with a support frame member on which a workpiece to be worked is placed and which is disposed proximate to but not contacting the circular saw blade.

7. The circular sawing machine according to claim 1, wherein a support frame member is provided for the base table, on which a workpiece is supported, the support frame member being swingable with respect to the base table about an axis fixed with respect to the base table and parallel to but spaced from an axis of rotation of the rotational shaft of the circular saw blade.

8. The circular sawing machine according to claim 7, wherein the support frame member has a pipe structure.

9. The circular sawing machine according to claim 1, wherein a support frame member is provided for the base table, on which a workpiece is supported, the support frame member being detachably provided for the base table.

10. The circular sawing machine according to claim 9, wherein the support frame member has a pipe structure.

* * * * *